R. ROSNER.
SLACK TAKE-UP FOR BELT TRANSMISSION.
APPLICATION FILED NOV. 16, 1918.
1,326,532.
Patented Dec. 30, 1919.
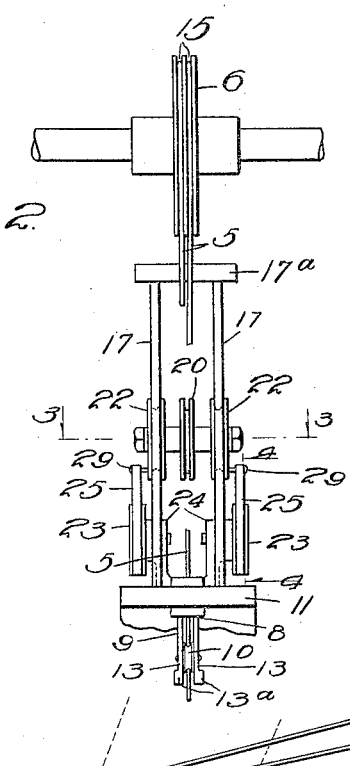
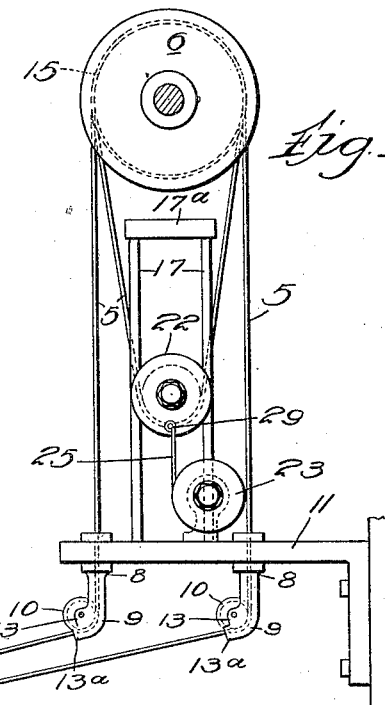
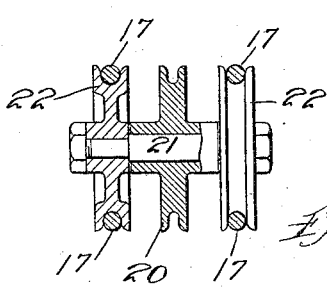
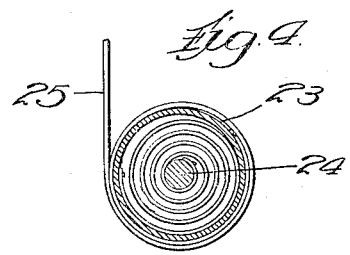
Inventor:
Rudolf Rosner.
by Burton & Burton his attys.
Witness:

UNITED STATES PATENT OFFICE.

RUDOLF ROSNER, OF CHICAGO, ILLINOIS.

SLACK TAKE-UP FOR BELT TRANSMISSION.

1,326,532.  Specification of Letters Patent.  Patented Dec. 30, 1919.

Application filed November 16, 1918. Serial No. 262,785.

*To all whom it may concern:*

Be it known that I, RUDOLF ROSNER, a citizen of the United States, residing at Chicago, in the county of Cook and State of Illinois, have invented certain new and useful Improvements in Slack Take-Ups for Belt Transmissions, of which the following is a specification, reference being had to the accompanying drawings, forming a part thereof.

The purpose of this invention is to provide an improved means for taking up the slack of a driving belt in a belt transmission. It consists in the elements and features of construction shown and described, as indicated in the claims.

In the drawings, the invention is shown applied to a grinder mechanism associated with a lathe, some portions of the latter appearing in the drawings in which—

Figure 1 is a side elevation of so much of the structure as comprises the belt transmission and the necessary supporting parts.

Fig. 2 is a front elevation of the belt transmission and connected parts shown in Fig. 1.

Fig. 3 is a section at the line, 3—3, on Fig. 2.

Fig. 4 is a section at the line, 4—4, on Fig. 2.

The drawings illustrate a particular instance of a belt transmission requiring provision for slack and slack take-up, this particular instance being that of a grinder or other tool mounted upon a lathe bed for movement therealong to reach different parts of the work, or transversely to perform its work. It will be understood that the lathe and the grinding devices constitute in themselves no part of the present invention, and they are merely included in the drawings for the purpose of presenting a practical embodiment of the invention, which relates to the belt transmission and take-up devices therefor. In these drawings there is shown upon the lathe bed, 1, a platform, 2, which carries the grinding mechanism, 3, of which 4 is the driven pulley of the train in which is the transmission belt, 5, to which the slack take-up devices are applied. 6 is the driving pulley of this train, which is mounted in such position with relation to the driven pulley on the grinder mechanism as to require deflection of both plies of the belt away from the approximately vertical direction in which they extend from the driving pulley to an approximately horizontal direction in which they extend to the driven pulley of the grinder. Such deflection to the approximately horizontal position being necessary, or at least desirable, in order to cause the belt to run in a convenient direction for accommodating the movement of the grinder along the bed of the lathe to reach different parts of the work; and for fitting and accommodating such movement the deflectors, 8, 8, of the two plies of the belt are mounted for swiveling about vertical axes, that is, about axes which extend in substantially the direction of the plies of the belt between the driving pulley and the deflectors. These deflectors consist each of the bracket or hanger, 9, in which is journaled the deflector pulley, 10, about which the belt ply runs, the hanger being swiveled to a fixed support, 11. For insuring the retention of the belt on the deflector pulleys upon slacking of the belt and also in the swiveling movement, these brackets or hangers are each formed with a shield, 13, extending around the pulley at the side about which the belt passes, outside the belt, and flanges, $13^a$, $13^a$, extend from this web embracing the pulley quite closely so that the belt cannot escape therefrom.

The slack take-up devices will now be described. The drive pulley is provided with a double track for the belt, which when this belt is of cable or rope form, consists of two grooves, 15, 15, in the face of the driving pulley. Upon the bracket, 11, upon which the deflectors are mounted, there are fixed four vertical guide rods, 17, connected at their upper ends by a spider plate, $17^a$. These rods afford guidance for a carrier for a take-up pulley, 20, which is positioned with its belt track in a vertical plane substantially midway between the vertical planes of the two belt tracks on the drive pulley. The belt passing from one of the deflectors, 10, to the drive pulley and about it in one of its tracks travels thence about the take-up pulley, 20, in the single track of the latter, then back to the second track of the drive pulley and thence to the other deflector, from which it runs around the driven pulley, 4, of the grinder with its associated deflectors, 18, 18, returning to the first deflector, completing the circuit. The carrier for the take-up pulley consists of a shaft, 21, upon which the take-up pulley is mounted for rotation, said shaft having also mounted upon it two flanged pulleys, 22, 22, whose flanges engage the vertical guide rods, 17, which thereby serve to guide the carrier in its movement toward and from the drive pulley to prevent it from swiveling or swaying. The carrier is provided with a draft device for pulling it away from the drive pulley to take up slack of the belt. As illustrated, this draft device comprises two drums or spring casings, 23, 23, mounted for rotation upon a bearing, 24, which is fixed with respect to the draft pulley, being for that purpose most conveniently mounted upon the bracket, 11, which carries the deflectors, 8, each of said drums or spring casings inclosing a coiled spring, the inner end of which is secured to the bearing, the outer end being secured to the casing or drum, 23. Said drums are of the nature of windlasses about which windlass cords, 25, 25, are coiled in proper direction to coil the springs upon the unwinding of the windlass cords, one end of the cord being secured to the drum and the other end to the take-up carrier. As illustrated, the connection of the windlass cord to the carrier is effected by attaching it to a pin, 29, projecting from the outer face of the flanged guide pulley at a point removed from the center, so that the stress on the cord tends to hold the guide pulley non-rotating on the shaft on which the take-up pulley and both the guide pulleys are mounted loosely.

Thus it becomes unimportant, whether or not the guide members, 22, 22, are complete circular pulleys so long as their faces which engage the guide rods, 17, are concentrically curved, thus preventing any cramping of the guides, 22, between the rods.

And it may be further noted, that by virtue of the symmetrical arrangement of the take-up pulley, 20, with respect to the drive pulley, 6, and all plies of the belt, 5, running to or from said drive pulley, the device will be equally effective with the drive pulley operating in either direction,—that is, regardless of the direction of travel of the belt, 5.

I claim:—

1. In a belt transmission a slack take-up device comprising in combination with the transmission belt driving and driven pulleys of which one has a double track for the belt; a take-up pulley and a carrier for the same mounted for movement toward and from the double track pulley, and a yielding draft device connected with the carrier for yieldingly withdrawing it from the double track pulley; the transmission belt running about the double track pulley in both tracks thereof and intermediately about the take-up pulley.

2. In the construction defined in claim 1, take-up pulley guiding means comprising parallel guide rods and flanged pulleys on the take-up pulley carrier engaging the guide rods by their flanges.

3. In the construction defined in claim 1, the yielding draft means comprising a coiled spring; a fixed support to which one end of the spring is attached and a windlass device to which the other end of the spring is attached, and a flexible connector from the take-up pulley carrier and winding on the windlass.

4. In the construction defined in claim 1, the take-up pulley guiding means comprising parallel guide rods and two flanged pulleys mounted coaxially with the take-up pulley at opposite sides thereof and engaging the guide rods by their flanges, the take-up pulley being revoluble independently of said flanged pulleys.

5. In the construction defined in claim 1, the yielding draft means being a spring-operated windlass device, the windlass cord being attached to the take-up pulley carrier.

6. In the construction defined in claim 5 foregoing, the windlass device comprising a fixed bearing, two springs having their inner ends attached to the bearing at a distance from each other, drums mounted revolubly on the bearings, the outer ends of the springs being attached to the drums respectively, and cables attached to the take-up pulley carrier at opposite sides of the take-up pulley and winding on the drums respectively.

In testimony whereof, I have hereunto set my hand at Chicago, Illinois, this 12th day of November, 1918.

RUDOLF ROSNER.